Patented Dec. 13, 1932

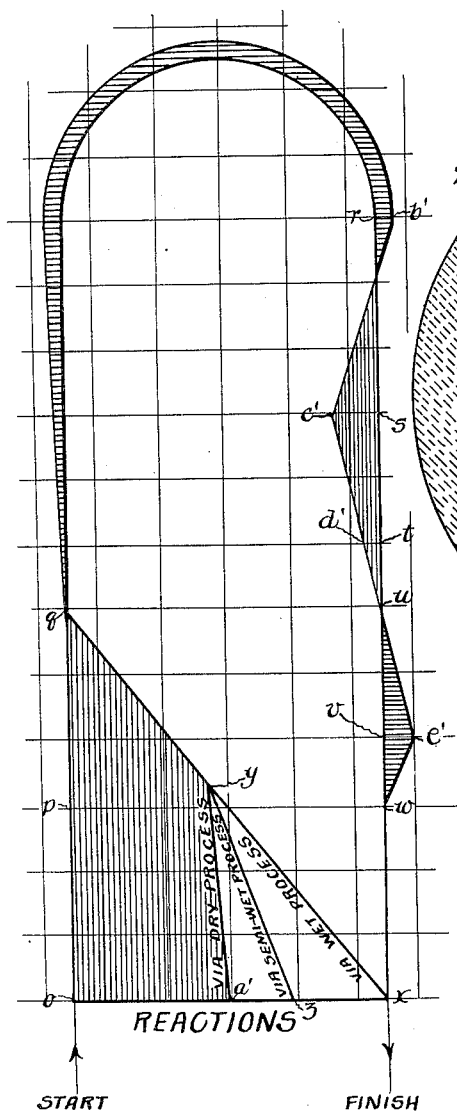
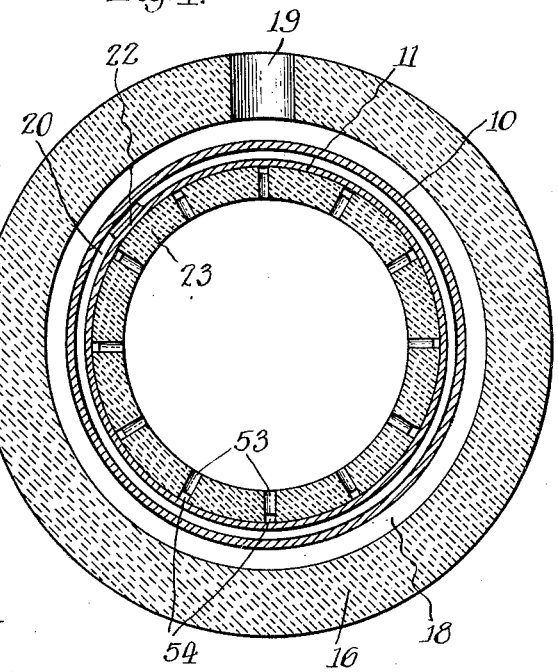

1,890,662

UNITED STATES PATENT OFFICE

FRANK C. GREENE, OF OCONOMOWOC, WISCONSIN

MEANS FOR HEAT TREATING MATERIAL

Application filed February 2, 1928. Serial No. 251,301.

The present invention relates to a new and improved means for heat treating materials in the presence of fuel, as for example calcination, smelting, reclamation and reduction involving the treatment of earths, metals, metalloids, lithopone, strontia, sodium carbonate, and ores, etc., and for purposes of illustration is related particularly to a novel means for burning cement.

Briefly stated, the calcination or burning of cement consists in heating the finely divided and intimately mixed raw materials, consisting mainly of the carbonates of silicon, calcium and aluminum, first to a relatively low temperature to drive off the moisture and other substances, then to a higher temperature to decompose the carbonates into the oxides of the metals, thereby giving off carbon dioxide, and finally to a still higher temperature to form the calcium aluminates and calcium silicates, the clinkers of which substances when pulverized form cement. Heretofore, two distinct general methods have been employed, i. e., one involving a dry process in which the dry raw materials are calcined, and the other involving a wet process in which the raw materials are mixed with water to form a slurry and are then calcined. The wet process is the one most in use due to its economy in labor and its superior product.

The materials may be treated in batches or continuously. In the batch process, the requisite heat is obtained by charging the kiln with alternate layers of the raw materials and the fuel, and sending a blast of air through the heated mass to ignite the fuel. In the continuous process, the requisite heat is commonly obtained by discharging a stream of burning gas, oil or powdered fuel into one end of a rotary kiln, and withdrawing the products of combustion from the other end. In all of these processes, there is a large waste of heat, particularly low grade heat, i. e., heat below the temperature of the reaction.

The primary object of the present invention resides in the provision of a new and improved means for treating materials, as for example burning cement, which is efficient and economical, and which more particularly substantially utilizes the waste heat or low grade heat normally passing out in the waste products and the clinker, or lost through radiation.

Still other objects reside in the provision of a novel means for burning cement, in which the materials and the fuel are intimately mixed before chemical reactions in the materials take place, in which the materials and the fuel are mutually and minutely impregnated before chemical actions in the materials take place, and in which the exothermicity and accompanying plasticity of the fuel at relatively low temperatures are utilized to preheat, mix and mutually impregnate the mass.

Further objects reside in the provision of a novel means for burning cement in which the products of dehydration are utilized for preheating the incoming material in which the volatile constituents of the fuel are driven off at relatively low temperatures and withdrawn without becoming cracked and decomposed, in which the carbon dioxide resulting from the combustion of the fuel and the decomposition of the carbonates is reduced to carbon monoxide, and in which the outgoing gases and the clinker are utilized to preheat the incoming materials so that said gases and said clinker are expelled at relatively low temperatures.

Other objects are to provide a new and improved means for burning cement in which the operation is continuous, which produces a uniform, friable, and easily ground cinderlike clinker and a uniformly burned product, which requires a relatively small amount of fuel, and which has a large capacity.

An important object of the invention resides in the provision of a new and improved kiln for burning cement which has a high thermal efficiency, conserves the low grade heat, has a large capacity, and produces a uniformly burned soft, friable cement clinker.

Another object is to provide a kiln of the above character which is simple and relatively inexpensive in construction, and which for its capacity has relatively small overall dimensions.

Other objects reside in the provision of a novel kiln having one or more of the following features:

(1) A vertical retort, (2) a rotor for propelling the raw material upwardly through the retort, (3) the rotor being hollow and concentric to the retort to receive the material therefrom and to guide the same downwardly, (4) a closed furnace wall for directing the gases and vapors downwardly outside of the retort, (5) an air-cooled bosh for the lower end of the rotor, (6) an agitator and a periodically opening valve in the lower end of the bosh, (7) means for controlling the temperature in the rotor, (8) generally, means for reversing the direction of movement of the material through the kiln so as to effect a heat exchange from the outgoing products to the incoming materials, and (9) a rotor shaped to cause the products of dehydration to descend so as to preheat the incoming materials.

Further objects and advantages will become apparent as the description proceeds.

In the accompanying drawings, Fig. 1 is a vertical sectional view, partially diagrammatic in character, illustrating a kiln embodying the features of my invention.

Fig. 3 is a diagrammatic representation of the heat supplied to the materials from internal sources as the latter pass through the successive stages in the method.

Fig. 4 is a sectional view taken along line 4—4 of Fig. 1.

Figure 1:
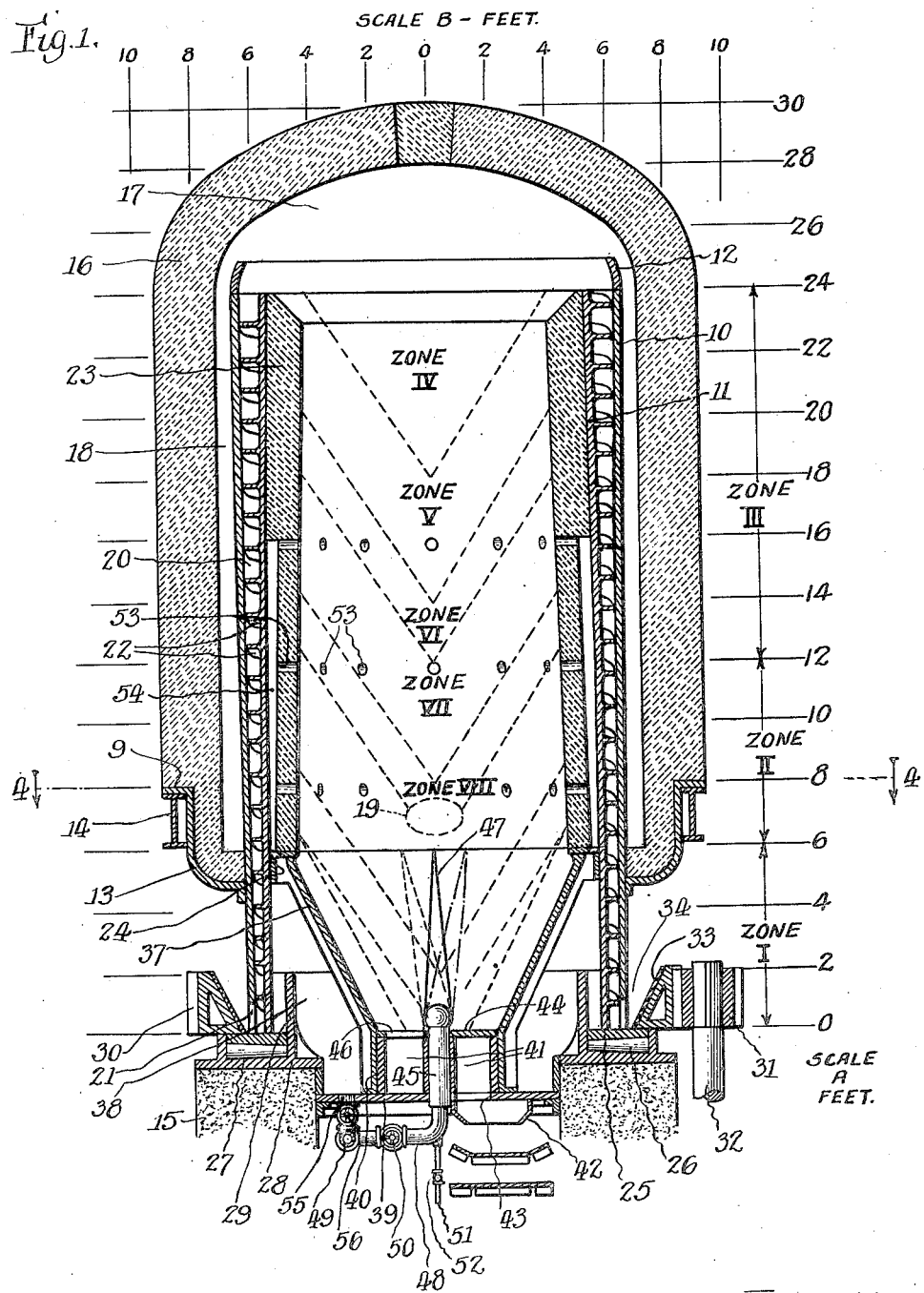

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the exemplary embodiment of the invention illustrated in the drawings, the kiln for carrying out the method may be provided in various forms, sizes, and relative proportions of parts. However, for purposes of illustration, I have shown in Fig. 1 of the drawings, two scales A and B respectively indicating vertical and lateral dimensions, and will herein definitely recite suitable dimensions for certain parts of the kiln. These scales also apply to Figs. 1 and 2. Preferably, the kiln comprises an outside retort 10 and an internal concentric rotor 11, both being disposed vertically. The rotor 11 is adapted to propel and direct the material to be treated through the retort in a predetermined path. This path includes a plurality of initial or preparatory zones, designated as zones I, II and III in the drawings, affording a preliminary treatment for the material, and a plurality of main zones, designated as zones IV, V, VI, VII and VIII in the drawings, affording the final or calcining treatment for the material. The preliminary treatment serves to preheat the incoming material, to drive off the volatile matter, such as the moisture and the volatile constituents of the fuel, and to effect an intimate mutual impregnation of the finely divided cement rock and fuel. The final treatment serves to calcine the cement rock and to generate certain combustible gases as a byproduct. To effect a heat exchange between the outgoing product and the incoming material, and thereby heat economy, the rotor 11 is hollow. The space between the retort and the rotor is divided upwardly into the preparatory zones, and the interior of the rotor is divided downwardly into the main zones. Air for oxidizing the fuel and sometimes steam are admitted in blasts to the lower end of the rotor 11 and in entering pass over the lower heated walls of the rotor to cool them. The combustible and non-combustible gases and the volatile constituents of the fuel, collecting over the rotor 11 are withdrawn downwardly over the outer surface of the retort, thereby effecting a further heat exchange to the incoming material. The finished product and the gases thus leave the kiln at relatively low temperatures, and loss of most of the low grade heat is avoided.

In the present instance, the retort 10 comprises an integral cylindrical iron casting which is about 24 feet in length and 12 feet in diameter. The upper end 12 of the casting, about 1 foot in length, is curved inwardly, is detachable to permit withdrawal of the rotor, and preferably is of good heat resisting metal. This end 12 may be secured to the body of the rotor 10 by any suitable means (not shown). Any suitable means may be provided for nonrotatably supporting the retort 10, and in the present instance I have provided suitable inverted or cup-shaped supporting means 13 which may comprise a plurality of supporting brackets suitably joined and which preferably comprises an integral ring of metal encircling and secured to the lower end of the rotor. The supporting ring 13 has an outwardly extending flange 9 at its upper periphery which rests on a frame structure 14 built on a suitable base or foundation 15.

Enclosing the major portion of the retort, i. e. the portion above the supporting ring 13 at elevation 6, is a furnace 16 which reaches an elevation of about 30 feet so as to define a dome space 17 over the retort, and which is spaced peripherally from the rotor so as to provide a closed annular space 18 thereabout communicating at its upper end with the dome space 17. The furnace wall is of refractory material, preferably brick-work, and rests at its lower end on the supporting ring 13. Opening from the lower end of the space 18 is a suitable outlet passage 19 through which the gases may leave the kiln.

The rotor 11 is substantially the same in length as the retort 10, and but slightly less in diameter so as to provide a small annular space 20 therebetween. The ends of the retort terminate respectively about one foot above the ends of the rotor, thereby providing an annular inlet opening 21 to the lower end of the space 10, and providing a guard (in the form of the end 12) for preventing material from the space 20 from passing over the retort into the furnace space 18. Preferably, the rotor comprises an integral cylindrical iron casting the upper end of which tapers slightly inwardly, thereby gradually increasing the width of the space 20. In the present instance, the taper begins at the midpoint, i. e. elevation 12. Formed on the outer surface of the rotor 11 is a suitably pitched screw thread 22 of suitable form for elevating the material through the space 20. The width of the thread 22 is the same as that of the space 20, and hence increases slightly in the upper half.

The inner surface of the rotor 11 is suitably lined with refractory material 23, preferably brick-work, which is acid or basic, depending upon the character of the material to be treated. Any suitable means may be provided for supporting the refractory lining 23, and in the present instance I have shown for this purpose a flanged or angle ring 24 suitably secured to the lower end of the rotor, i. e. approximately at elevation 6.

The space 20 comprises the preparatory zones I, II and III. The limits of these zones may not be sharply defined, and may vary with changes in the heat gradient. For purposes of illustration, I have designated the space between elevations 0 and 6 as zone I, the space between elevations 6 and 12 as zone II, and the space between elevations 12 and 24 as zone III. It will be noted that the taper on the rotor 11 begins at the start of zone III. The interior of the rotor 11 comprises the main zones IV, V, VI, VII and VIII. Here also the limits of the zones are not sharply defined and may vary with changes in the heat gradient. The limits of these zones are not horizontal, but, because the reactions occur first at the walls of the retort where the blast is purposely most pronounced, are inverted conical surfaces, as indicated by the bent dotted lines in Fig. 1. For purposes of illustration, I have shown the zones IV, V, VI, VII and VIII axially between elevations 18 and 24, 14 and 18, 12 and 14, 8 and 12, and 0 or 6 and 8, respectively.

Any suitable means may be provided for supporting and driving the rotor 11, and in the present instance I have shown the rotor resting on and secured to a suitable drive ring 25. This ring rotates upon a plurality of conical roller bearings 26 disposed in an annular race-way 27 formed in a base casting 28 resting on the foundation 15. The inner wall 29 of the race-way 27 is extended upwardly into spaced relation with the lower end of the rotor 11, and is adapted to serve as a guide for the insertion or withdrawal of the rotor. Rigidly joined with the outer edge of the ring 25 and resting on the upper edge of the outer wall of the base casting 28 in an annular feed pan gear 30 which is in the form of a spur gear meshing with a suitable pinion 31 on a drive shaft 32.

Any suitable means may be provided for feeding material through the opening 21 to the lower end of the space 20. In the present instance, the gear 30 has an inner frustro-conical surface 33, and hence constitutes a container defining an annular space 34 about the rotor 11 adapted to receive the raw materials. Preferably, the materials, i. e. the cement rock and the fuel, are ground together into a finely divided state and in the presence of water. The ground mixture is filtered, and the damp mass is then placed in the container 34 by any suitable means (not shown). The container may be of any suitable height, and if the materials therein form a slurry, they will create an hydraulic head which will tend to assist propulsion of the material in the lower end of the retort 10.

Means is provided for removing the product or clinker from the lower end of the rotor 11. This means preferably comprises an inverted frustro-conical discharge hopper or bosh 37 which is secured to and projects downwardly from the ring 24 and axially of the rotor, and which is made of suitable heat resistant metal. The bosh 37 is spaced from the lower end of the rotor 11 and defines therewith an air chamber 38 closed at the lower end by a wall 39. The bosh 37 is designed for maximum radiation, and may need to be varied in shape for different kinds of material, thus requiring that the ring 24 be adjustable along the rotor 11. The lower end of the bosh 37 is closed by a suitable discharge gate 40 which may be of well known construction, and which preferably comprises a member having a plurality of pockets 41 alternately opening to the bosh 37 and to a discharge chute 42 upon rotation of the rotor 11. In the present instance, the gate 40 is rotatable with the bosh 37 and rests on the wall 39, and the latter has an opening 43 directly over the chute 42. Overlying the gate 40 is a wall 44 which is rigidly secured to the wall 39 by means of a stem 45 extending axially through the gate 40, and which has an opening 46 spaced 180° from the opening 43. It will be evident that as the gate 40 is rotated with the rotor 11, each of the pockets 41 will be moved alternately into registration with the openings 43 and 46.

Mounted on the plate 44 and connected to the stem 45 is an agitator 47. Preferably, the agitator is pointed, extends a substantial distance upwardly into the bosh 37, and has a flexible connection with the stem 45 so as to permit wobbling, different positions of the agitator being shown in dotted outline in Fig. 1. The agitator 47 serves to facilitate removal of the cinder-like clinker through the gate.

Means is provided creating a blast of air or air and steam upwardly through the rotor 11. To this end the agitator 47 is adapted to discharge fluid under pressure into the lower body of the mass of treated material in the bosh 37. The lower end of the agitator 47 is connected through the stem 45, and a pipe 48 to an air supply pipe 49 adapted to be connected to a suitable source of air (not shown). Interposed in the pipe 48 is a suitable control valve 50. Steam may be supplied to the stem 45 through a pipe 51 adapted to be connected to a suitable source, and having a suitable control valve 52. The temperature in the rotor 11 may be controlled, and prevented from going above a predetermined maximum point by regulating the supply of steam, and the steam that is supplied may form water gas with some of the fuel. Air is also adapted to be supplied to the lower half of the rotor 11 through suitable tuyères 53 comprising a plurality of openings in the refractory lining 23. Preferably, these openings are arranged in circumferentially spaced groups, and the openings of each group are vertically alined. The inner ends of the openings of each group are connected through a vertical passage 54 opening to the chamber 38. This chamber is connected to the air supply pipe 49 by a pipe 55 in which a suitable valve 56 is interposed. Air in passing through the chamber 38 from the pipe 49 to the tuyères 53 is preheated by heat from the walls of the bosh 37. By supplying air through the agitator and the tuyères, combustion is distributed throughout the zone of combustion.

Figure 2:
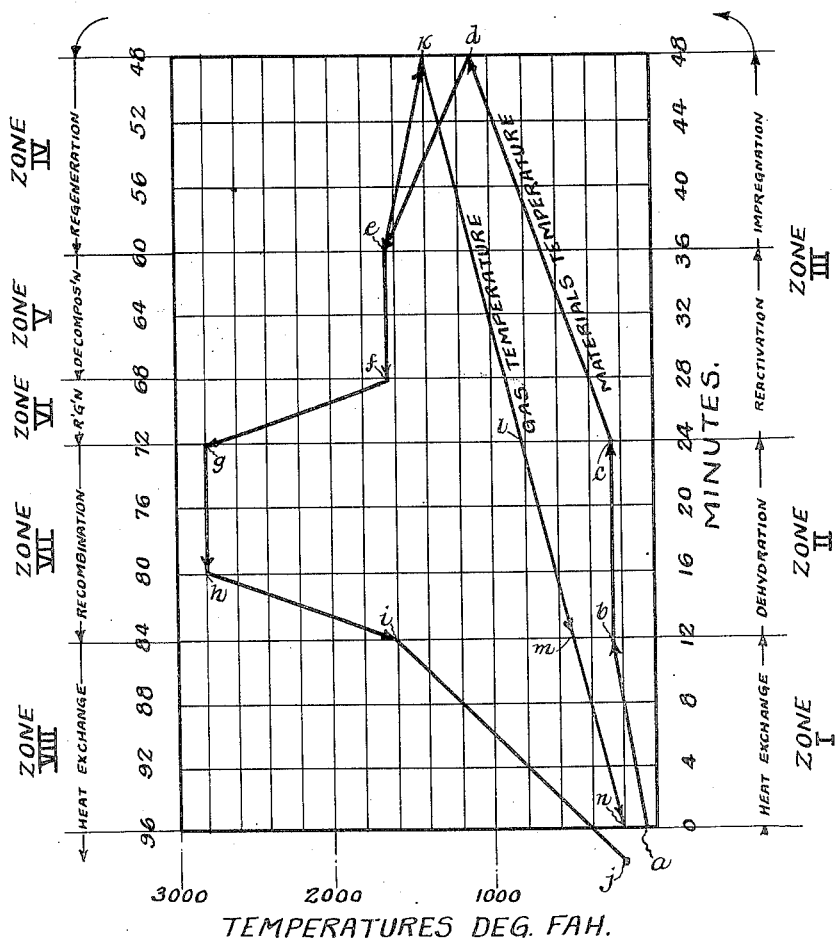
Fig. 2 is a temperature-time graph of the method employed in operating the kiln, suitable legends indicating the general reactions occurring in the different stages in the method.

The method employed in operating the kiln will now be described in connection with Figs. 1 to 3. In Fig. 2, the temperature of the material in passing through the zones I to VIII is represented by the line $a$—$b$—$c$—$d$—$e$—$f$—$g$—$h$—$i$—$j$, and the temperature of the gases is represented by the line $e$—$k$—$l$—$m$—$n$. The zones, the reactions and the time in minutes required to pass through the zones are indicated at the sides of the graph, the characters on the right relating to the line $a$—$b$—$c$—$d$, and the characters on the left relating to the line $e$—$f$—$g$—$h$—$i$—$j$. In Fig. 3, the line $o$—$p$—$q$—$r$—$s$—$t$—$u$—$v$—$w$—$x$ represents the "up" and "down" path of the material in passing through the kiln; areas (vertical shading) on the inside of this line represent quantities of endothermic heat from within the material, and areas (lateral shading) on the outside of the line represent quantities of exothermic heat, in B. t. u. per pound of clinker, added at different points along the path through zones I to VIII. While the method is herein illustrated with one specific form of apparatus, it will be understood that the method may be carried out in any suitable apparatus. It will further be understood that the method is not limited to the dry process or the wet process, and in its broadest aspects to the batch process, or the continuous process, and in the present instance is described as a semi-wet continuous process because the latter is believed to be the most advantageous, and embodies numerous detailed features of the invention.

The raw materials and the fuel are finely divided and intimately mixed. Preferably, they are ground together, and in the presence of water, thereby forming a slurry. Slurry ordinarily contains from 30 to 35% water and from 65 to 70% solid matter ground to pass 95% thereof through a 100 mesh sieve. The fuel may be of any suitable kind, and preferably is ordinary coal.

The slurry of the finely divided and intimately mixed raw materials and coal is passed through a filter press (not shown) to remove the excess water, thereby leaving a moist mass which is ready for the kiln. It will be understood that supplying the mass to the kiln in the moist condition instead of in a slurry results in heat economy.

Assuming the kiln to be in operation, the initial mixture is placed in the container 34 from where it enters through the opening 21 into the lower end of the annular space 20, and is elevated through said space by the screw thread 22. The mixture enters the kiln at about 60° F., and as it is moved upwardly is gradually heated to the temperature of boiling water (212° F.). This action takes place in zone I which is characterized by the addition of endothermic heat through heat exchange from descending steam vapors to the incoming mixture. The temperature change is represented by the line $a$—$b$ in Fig. 2, and takes place over a period of 12 minutes. The quantity of heat added is represented in Fig. 3 by the area $o$—$p$—$y$—$z$. The quantity of heat which would be added, if the wet process were employed is represented by the area $o$—$p$—$y$—$x$. The quantity of heat which would be added, if the dry process were employed is represented by the area $o$—$p$—$y$—$a'$.

The mixture is now elevated through zone

II wherein it is dehydrated. This action takes place at 212° F. and over a period of about 12 minutes (see Fig. 2). Endothermic heat is added to the material through heat exchange from the downwardly moving and outgoing gases in the space 18, and product in the rotor 11, and the quantity of heat is represented in Fig. 3 by the area p—q—y. The steam and other volatile matters driven off in zone II pass downwardly through zone I to preheat the incoming mixture. This is accomplished by reason of the seal produced in the lower end of zone III as will be subsequently described.

The dehydrated mixture is now elevated through zone III. In this zone, the temperature of the material gradually increases along line c—d from 212° F. to 1100° F., and about 24 minutes are required. In the first portion of zone III, the fuel is heated to its first exothermic point, thus becoming plastic and giving off heat. Other points of exothermicity are attained along zone III, 1100° F. being the temperature of maximum exothermicity. In becoming plastic, the finely divided coal and cement-rock become mutually and intimately impregnated, i. e., the reactivated and plastic coal tends to invade the finely ground rock material to effect what amounts substantially to a molecular distribution. The volatile constituents of the coal which are driven off in this zone, in part condense upon the material, thereby aiding in the minute impregnation, and in part exit to the region of the dome space 17 of the apparatus from where they are withdrawn, together with other gases, downwardly about the retort 10. The rotor 11 and screw thread 22 are so designed, that the swelling plastic material at the initial part of zone III will effectually seal the space at that point between the rotor and the retort so as to cause most of the steam generated in zone II to descend, as previously described. The taper of the rotor prevents a seal beyond the initial part of zone III. Referring to Fig. 3, the area q—r—b' represents the exothermic heat added to the mass in zone III.

The mass under treatment is discharged from zone III over the top end of the rotor 11 to the interior thereof, and then passes downwardly first through zone IV. About 12 minutes elapse in passing through zone IV, and the temperature increases along line d—e (Fig. 2) from 1100° F. to 1650° F., the temperature of decomposition of the carbonates. The heat is absorbed from the heated gases and products of combustion passing upwardly through the rotor 11, and the quantity of endothermic heat added in this zone is represented by the area r—s—c' (Fig. 3).

The heat required to be added to the materials in the rotor 11 is obtained by burning the reactivated fuel so intimately dispersed and impregnated with the carbonates in zone III. To support the combustion, air is supplied in blasts through the agitator 47 and the tuyères 53 in the lower half of the rotor. By reason of the entry of air through the tuyères 53, combustion at the walls is in advance of combustion at the center of the rotor. The temperature may be controlled by supplying steam with the air through the agitator 47. The steam absorbs endothermic heat, and reacts with part of the fuel to form water gas. Obviously, when starting up operation, it is necessary to build up a bed of fire and heated materials in the rotor 11.

The material now passes downwardly through zone V, the time required being about 8 minutes. In this zone, the carbonates mainly of calcium, silicon and aluminium are decomposed into the oxides of these metals, thereby liberating carbon dioxide which in the presence of unburned fuel is converted in part into carbon monoxide. This gas and the other gases passing through the rotor join the volatile constituents of the coal in the dome 17, and make exit over and about the outside of the retort with a declining heat gradient along line e—k—l—m—n to about 200° F. (see Fig. 2). The temperature in zone V remains constant at about 1650° F., and the quantity of endothermic heat added in the decomposition is represented by the area s—t—d'—c' (see Fig. 3).

The material now passes through zone VI. This zone is in the region of combustion, and hence the temperature of the mass rises very quickly (in about 4 minutes) along line f—g to 2800° F. (see Fig. 2), the temperature of recombination. The endothermic heat added is represented by the area t—u—d'.

The material now passes through zone VII which is also in the region of combustion. In this zone, the metallic oxides recombine to form calcium aluminate and calcium silicate which when ground form cement. The temperature remains constant at about 2800° F., over a period of 8 minutes, and the reaction is exothermic, the heat given off being represented by the area u—v—e'. It is here that the beneficial effects of intimately impregnating the rock material with the fuel is had. We have not only the desired mixture and temperature conditions, but also a certain physical state of the mass permitting a rapid, complete and uniform recombination of the oxides. The resulting clinker is friable, i. e., cinder-like in structure, is soft, and can be easily ground to the desired fineness, thereby saving in cost, time and manual labor.

In the final zone, designated as zone VIII, the clinker passes downwardly through the rotor to the discharge gate 40 through which it is discharged onto the conveyor. In passing down the rotor 11 and the bosh 37, the clinker preheats the material passing upwardly in zones I and II and the air in the chamber 38, and leaves the kiln at approximately 400° F.

It will be evident that I have provided a novel and highly advantageous means for burning cement and in general for treating materials in the presence of fuel. The counterflow of the incoming and outgoing materials results in a high thermal efficiency. The thorough and minute impregnation of the material with the fuel results in a quick, uniform and complete reaction. The provision of a hollow rotor reduces the height of the kiln, and the invention results in a saving of time, labor and expense, and in an improved product.

I claim as my invention:

1. A kiln for burning cement and like material comprising, in combination, a hollow vertical rotor adapted to receive the material to be burned at its upper end, means for discharging burned material from the lower end of said rotor, an agitator in the lower end of said rotor, and means for supplying air through said agitator to said rotor.

2. A kiln for burning cement and like material having, in combination, a vertical retort, a concentrically arranged rotor having means for conveying material through said retort, said retort projecting slightly above said rotor, said rotor being hollow to receive material from the upper end of said retort, a closed furnace wall disposed about and over the discharge end of said retort and in spaced relation thereto, means for withdrawing gas from the lower end of said furnace chamber, means for supplying air to said rotor, and means for removing material from the lower end of said rotor.

3. A kiln for burning cement and the like material comprising, in combination, a hollow vertical rotor adapted to receive the material to be burned and fuel at its upper end, means for automatically discharging burned material from the lower end of said rotor, means for supplying air of combustion to said rotor to ignite the fuel, and an agitator in the lower end of said rotor.

4. A kiln for burning cement and like material having, in combination, a retort, a rotor having means for conveying material through said retort, said rotor being hollow to receive material from one end of said retort, a closed furnace wall disposed about and over the discharge end of said retort and in spaced relation thereto, means for withdrawing gas from the furnace chamber, means for supplying air to said rotor, and means for removing material from said rotor.

5. A kiln for heat treating material comprising, in combination, an outer cylinder, an inner hollow cylinder extending longitudinally into said outer cylinder, said inner cylinder being closed against the discharge of material therefrom into said outer cylinder, means on one of said cylinders for conveying material through the space defined between said cylinders upon relative rotation thereof, and discharging said material into said inner cylinder, means for supplying air to said inner cylinder, and means for relatively rotating said cylinders.

6. A kiln for heat treating material comprising, in combination, an outer cylinder, an inner cylinder extending longitudinally into said outer cylinder, means on one of said cylinders for conveying material through the space defined between said cylinders upon relative rotation thereof and discharging said material into said inner cylinder, means for supplying air to said inner cylinder, and means for relatively rotating said cylinders, one of said cylinders being tapered on one end to increase the width of said space in one end, said first mentioned means increasing in width with said space.

7. A kiln for burning cement and like material comprising, in combination, a closed furnace chamber having a gas outlet at its lower end, a vertical retort extending upwardly into said chamber and being open at its upper end, a vertical rotor extending concentrically through said retort and having means for conveying material therethrough, said rotor being open at its upper end, tuyères formed in said rotor, discharge means at the lower end of said rotor defining an annular air chamber with said rotor, said tuyères and said chamber being in communication, and means for supplying air of combustion to said chamber.

8. A kiln for burning cement and like material, comprising, in combination, a vertical retort, a hollow rotor extending longitudinally into said retort and having means for conveying material upwardly through the space defined between said retort and said rotor and discharging said material into said rotor, means for supplying air to said rotor, said rotor being gradually tapered to a smaller size in its upper end, and means for turning said rotor.

9. A kiln for burning cement and like material comprising, in combination, a closed furnace chamber having a gas outlet at its lower end, a vertical retort extending upwardly into said chamber and being open at its upper end, a vertical rotor extending through said retort and having means for conveying material therethrough, said rotor being open at its upper end, a refractory lining in said rotor, tuyères formed in said refractory lining, a bosh in the lower end of said rotor, said bosh defining an annular air chamber with the lower end of said rotor, a discharge gate in the lower end of said bosh, said tuyères and said chamber being in communication, and means for supplying air of combustion to said chamber, the upper end of said retort extending beyond the upper end of said rotor so as to direct material therefrom to the inside of said rotor.

10. A kiln for burning cement and like material, comprising, in combination, a retort, a rotor extending longitudinally and axially through said retort, said rotor having a screw thread conveyor on its outer surface for passing the material through said retort, and means for causing the heating of the interior of said rotor and the exterior of said retort.

11. A kiln for burning cement and like material comprising, in combination, a vertical retort, a rotor extending axially through said retort, said rotor having a screw thread conveyor on its outer surface for conveying material and fuel through said retort, said rotor being adapted to receive the mixture from said retort, means for supplying air of combustion to said rotor to consume the fuel in said mixture, heat in said rotor being available to heat the material and fuel between said rotor and said retort, and means for removing the burned material from said rotor.

12. A kiln for burning cement and like material comprising, in combination, a vertical retort, a vertical rotor extending axially and concentrically through said retort, said rotor and said retort defining two concentric spaces, one of which is adapted to receive a mixture of the raw materials and fuel to preheat the same, and the other of which is adapted to receive the preheated mixture from the first space, conveyor means on said rotor, and means for admitting air of combustion to said other space to ignite the fuel and burn the materials.

13. A kiln for burning cement and like material comprising, in combination, a supporting structure, a vertical generally cylindrical retort mounted on said structure, a furnace wall extending about and over the upper end of said retort and in spaced relation thereto to define an annular furnace chamber thereabout, said furnace wall being supported by said structure and having suitable outlet means at its lower end, a rotor axially disposed in and extending substantially through said retort, said rotor being hollow and having a conveyor screw on its outer surface for conveying material upwardly through the annular space defined thereby with said retort, said retort being disposed slightly higher than said rotor to define an annular opening at the lower end thereof to said last mentioned space, means for supplying raw materials to said opening, means for rotating said rotor, a bosh secured to and depending from the lower end of the rotor, means in the lower end of said bosh for automatically and periodically discharging predetermined quantities of material therefrom upon rotation of said rotor, an agitator projecting upwardly into the lower end of said rotor, means for supplying air through said agitator to said rotor, means for directing air over the outer surface of said bosh through the sides of said rotor, and means for supplying steam to said rotor.

14. A kiln for burning cement and like material comprising, in combination, means for preheating the material to be burned, a hollow vertical rotor adapted to receive the preheated material at its upper end, means for discharging the burned material from the lower end of said rotor, and means for supplying air for combustion to said rotor.

15. A kiln for burning cement and like material comprising, in combination, a hollow vertical cylinder adapted to receive the material to be burned and fuel at its upper end, means for automatically discharging material periodically in predetermined quantities from the lower end of said cylinder, and means for supplying air of combustion to said cylinder to ignite the fuel and thereby to calcine the material.

16. A kiln for burning cement and like material comprising, in combination, a hollow vertical rotor adapted to receive the material to be burned at its upper end, means for automatically discharging material from the lower end of said rotor, means for supplying air to the lower end of said rotor, and tuyères in the walls of said rotor for supplying air to the interior of said rotor.

17. A kiln for burning cement and like material comprising, in combination, a hollow rotor having one end higher than the other and adapted to receive the material to be burned at its upper end, a bosh at the lower end of said rotor, means for automatically discharging material from the lower end of said bosh, means for supplying air to said bosh, tuyères for admitting air to the interior of the rotor, and means for directing the air to said tuyères over the outer surface of said bosh to preheat the air.

18. A kiln for burning cement and like material comprising, in combination, a vertical retort, a rotor extending axially through said retort and having means for conveying material upwardly therethrough, said rotor being hollow, means for supplying air to the interior of said rotor, and means for directing material from the upper end of said retort into said rotor.

19. A kiln for burning cement and like material comprising, in combination, a vertical retort, a rotor extending axially through said retort and having means for conveying material upwardly therethrough, said rotor being hollow, means for directing material from the upper end of said retort into said rotor, and means for directing air to the interior of said rotor.

20. A kiln for treating material in the presence of fuel comprising, in combination, means for defining a vertical annular space and for feeding a mixture of the material and fuel upwardly therethrough, means for defining an inner space concentric with respect to said first mentioned space and adapted to receive the mixture from the latter, means for supplying air of combustion to the mixture in said second space, and means defining an outer concentric space communicating with the upper ends of said first mentioned spaces and having a discharge opening at its lower end.

21. A kiln for burning cement and like material comprising, in combination, a retort, a rotor extending longitudinally and axially through said retort, said rotor having a screw thread conveyor on its outer surface for passing the material to be burned through said retort, and means for heating the material passing through said retort.

22. A kiln for burning cement and like material comprising, in combination, a retort, a rotor extending longitudinally and axially through said retort, said rotor having a screw threaded conveyor on its outer surface for passing the materials through said retort, and a furnace wall enclosing one end of said retort.

23. A kiln for burning cement and like material comprising, in combination, a supporting structure, a vertical generally cylindrical retort mounted on said structure, a furnace wall extending about and over the upper end of said retort and in spaced relation thereto to define an annular furnace chamber thereabout, said furnace wall being supported by said structure and having suitable outlet means at its lower end, a rotor axially disposed and extending substantially through said retort, said rotor being hollow and having a conveyor screw on its outer surface for conveying material upwardly through the annular space defined thereby with said retort, means for supplying raw material to the lower end of said space, means for rotating said rotor, a bosh secured to and depending from the lower end of the rotor, means in the lower end of said bosh for discharging material therefrom, and means for supplying air to said rotor.

In testimony whereof, I have hereunto affixed my signature.

FRANK C. GREENE.